United States Patent [19]

Neville

[11] Patent Number: 5,588,048
[45] Date of Patent: Dec. 24, 1996

[54] GEOGRAPHICALLY MAPPED TELEPHONE ROUTING METHOD AND SYSTEM

[75] Inventor: Daniel E. Neville, Orlando, Fla.

[73] Assignee: 800 Adept, Inc., Altamonte Springs, Fla.

[21] Appl. No.: 623,051

[22] Filed: Mar. 28, 1996

Related U.S. Application Data

[63] Continuation of Ser. No. 389,547, Feb. 15, 1995, abandoned, which is a continuation of Ser. No. 922,793, Jul. 31, 1992, abandoned.

[51] Int. Cl.$^6$ ................................................ H04M 3/42
[52] U.S. Cl. .................... 379/127; 379/201; 379/207; 379/211; 379/220
[58] Field of Search ................................. 379/201, 207, 379/209, 210, 211, 212, 221, 97, 265, 266, 94, 88, 89, 67, 127, 142, 220, 230, 58, 59, 60, 219

[56] References Cited

U.S. PATENT DOCUMENTS

| | | | |
|---|---|---|---|
| 3,614,328 | 10/1971 | McNaughton et al. | 370/62 |
| 4,757,267 | 7/1988 | Riskin | 379/113 |
| 4,797,818 | 1/1989 | Cotter | 379/94 |
| 5,033,079 | 7/1991 | Catron et al. | 379/211 |
| 5,095,505 | 3/1992 | Finucane et al. | 379/207 |
| 5,136,636 | 8/1992 | Wegrzynowicz | 379/207 |
| 5,311,572 | 5/1994 | Friedes et al. | 379/89 |
| 5,329,578 | 7/1994 | Brennan et al. | 379/89 |

OTHER PUBLICATIONS

Applied Telematics, Inc., "Instalink" Brochure.
Tiger Technical Guide, pp. 3–5, Oct., 1991.

*Primary Examiner*—Krista A. Zele
*Assistant Examiner*—Scott Wolinsky
*Attorney, Agent, or Firm*—Edward M. Livingston, Esq.

[57] ABSTRACT

A method and system for direct routing of telephone calls made by a caller originating from within specific calling areas to one of a plurality of locations of a second party according to certain criteria established by the second party. This routing is accomplished based on the assignment of latitude and longitude coordinates to a potential caller's location. Once these coordinates are assigned to each of the potential callers, the second party's criteria is applied to assign the potential caller to a second party. Such criteria could be existence within a previously-defined geographic area, a custom defined geographic area, or through calculations such as the shortest distance between coordinate points. Once all such assignments have been made, a database is assembled to be used by a long distance carrier for direct routing of telephone calls from callers to an assigned second party.

16 Claims, 9 Drawing Sheets

| NPA | NXX | ZIP | Plus4 | Count | % |
|---|---|---|---|---|---|
| 212 | 239 | 10017 | 3687 | 3471 | 52.74% |
| 212 | 239 | 10017 | 6870 | 977 | 14.84% |
| 212 | 239 | 10017 | 6872 | 966 | 14.68% |
| 212 | 239 | 10017 | 0247 | 854 | 12.97% |
| 212 | 239 | 10017 | 8561 | 187 | 2.84% |
| 212 | 239 | 10017 | 2134 | 95 | 1.44% |
| 212 | 239 | 10017 | 5428 | 32 | 0.49% |
| | | | | 6582 | 100.00% |
| 212 | 239 | 10018 | 2687 | 523 | 30.62% |
| 212 | 239 | 10018 | 7024 | 405 | 23.71% |
| 212 | 239 | 10018 | 0687 | 378 | 22.13% |
| 212 | 239 | 10018 | 5618 | 285 | 16.69% |
| 212 | 239 | 10018 | 1342 | 99 | 5.80% |
| 212 | 239 | 10018 | 8542 | 18 | 1.05% |
| | | | | 1708 | 100.00% |
| 212 | 239 | 10017 | | 6582 | 65.82% |
| 212 | 239 | 10018 | | 1708 | 17.08% |
| 212 | 239 | 10001 | | 502 | 5.02% |
| 212 | 239 | 10016 | | 1208 | 12.08% |
| | | | | 10000 | 100.00% |

FIG.8

| NPA | NXX | ZIP | | Plus4 | Count | % |
|---|---|---|---|---|---|---|
| 212 | 239 | 10017 | - | 3687 | 3471 | 52.74% |
| 212 | 239 | 10017 | - | 6870 | 977 | 14.84% |
| 212 | 239 | 10017 | - | 6872 | 966 | 14.68% |
| 212 | 239 | 10017 | - | 0247 | 854 | 12.97% |
| 212 | 239 | 10017 | - | 8561 | 187 | 2.84% |
| 212 | 239 | 10017 | - | 2134 | 95 | 1.44% |
| 212 | 239 | 10017 | - | 5428 | 32 | 0.49% |
| 212 | 239 | 10018 | - | 2687 | 523 | 30.62% |
| 212 | 239 | 10018 | - | 7024 | 405 | 23.71% |
| 212 | 239 | 10018 | - | 0687 | 378 | 22.13% |
| 212 | 239 | 10018 | - | 5618 | 285 | 16.69% |
| 212 | 239 | 10018 | - | 1342 | 99 | 5.80% |
| 212 | 239 | 10018 | - | 8542 | 18 | 1.05% |

FIG.9

GEOGRAPHICALLY MAPPED TELEPHONE ROUTING METHOD AND SYSTEM

CROSS-REFERENCE TO RELATED APPLICATIONS

This is a continuation of application Ser. No. 08/389,547, filed Feb. 15, 1995, now abandoned; which is a continuation of application Ser. No. 07/922,793, filed Jul. 31, 1992, now abandoned.

BACKGROUND OF THE INVENTION

The invention relates to systems for routing telephone calls and more particularly to a system for automatic direct routing of telephone calls from customers to the nearest or best provider of desired goods or services.

Organizations who advertise products or services are faced with the dilemma of how to direct connect those who have need of the advertiser's product or service and those who can provide the advertiser's product or service, while at the same time ensuring that the caller can be serviced from within the provider's designated territory of interest.

There is a well-recognized need for a system that can directly route a customer's call to a provider of the advertiser's product in whose territorial limits the call originates, and do so by providing the caller with a direct connection to the provider, without human intervention after dialing, and without need of a computer to redial and place the call. Many previous inventions have addressed the issue of call routing, but each of these involve either human intervention after the call is placed (either by the caller or by an operator at a remote location) or a computer-initiated redial of that call. Systems that require input by either an operator, the caller after the call is placed or a computer before the call is dispatched to the final destination are termed interactive systems.

One example of an interactive system in the prior art is U.S. Pat. No. 4,757,267 by Riskin, dated Jul. 12, 1988. Riskin describes a system whereby a caller and an operator or computer interact to determine one of several possible locations to which the call can be routed. An inbound call is matched to a database. If the number from which the caller is calling matches a number in the database, the computer initiates a second call to a nearby provider. If that phone is busy, the computer redials to an alternate location closest to the first. If there is no answer at the second location, the computer dials a third location, which is the closest to the second. Processing time for the computer under this system is slow due to the number of areas and steps required in the process, to wit:

1. The computer must compute the distance between the caller and the first provider;
2. An outbound call is placed by the computer to the provider;
3. If no connection is made, step 1 is repeated for an alternate location;
4. Step 2 is repeated;
5. If no connection is made, steps 1 and 2 are repeated for a second alternate location;
6. If no provider is available, an operator intervenes and prompts the caller for information, allowing the operator to select from several possible locations to which the outbound call can be placed; and
7. If the caller does not use a touch-tone phone, step 6, that is, the intervening of an operator, is required in all cases, If the amount of computer interaction could be reduced by causing the call to be direct-routed, without an outbound call, to the proper location, processing time would be greatly reduced.

If the call could be direct-routed (not redialed) to the proper location when the call first reaches the Carrier Routing Center (CRC), the CRC would be able to handle far more calls with a much higher degree of accuracy (100% of calls direct routed to the proper location on the first and only attempt).

If human interaction could be eliminated, fewer errors in call routing would occur, and the amount of time required to dispatch a call would be greatly reduced.

The foregoing patent also requires that the caller dial from a "touch-tone" telephone in order to identify the caller's number and redial the computer. Many areas of the United States and other countries use rotary telephones. With the foregoing patent, callers who only have access to rotary telephone service are required to interact with the operator. With other systems, those calling from rotary telephone services are unable to be connected to the destination.

U.S. Pat. No. 3,614,328 by McNaughton, et al. dated Oct. 19, 1971, describes another interactive system, whereby the caller is prompted to dial additional numbers after the initial call is made. The foregoing system does not provide direct and immediate connection to the provider in which the call has originated.

Remote Call Forwarding (RCF) does not provide the same service as does this invention, for RCF only identifies to where a call is to be routed. RCF does not have the ability to identify geographic proximity to the provider, nor whether the call originated from within a provider's territory.

Certainly there are a great many advertisers who use single telephone numbers, such as "1-800" numbers, in their national or regionalized advertising, without benefit of direct call routing. These advertisers must do one of two things:

1. Employ various types of service bureaus (or themselves) to identify a caller (and the caller's location) and provide the caller with the telephone number and/or location of the closest provider of the advertiser's product; or
2. Employ various types of service bureaus (or their own personnel) to identify the caller (and caller's location) and forward the caller's information to the appropriate provider.

If the caller does not place the call to the number provided, or if the integrity of the caller's information is corrupted enroute to the provider, all potential effects of the call are negated.

In the prior art no system exists that allows a caller to place a call to an advertiser's national or regional telephone number and be immediately connected to the provider closest to the caller, in whose territory the call originated, and in the provider's designated area of interest.

Further, there also does not exist a system that can provide direct routing information to a Long Distance Carrier (LDC), or other telephone carrier based on a wide variety of territorial criteria as may be established by various advertisers. Even further, there also does not exist a system that direct-connects the caller to the final location with a single "inbound" call.

The present invention, unlike the Riskin patent, does not require a second routing means but rather direct-connects the caller to the appropriate location after the caller has dialed a single regionally or nationally advertised telephone number (a "1-800" number, for example), with no further calls being initiated, whether by a human operator or by a computer. This invention works in conjunction with, and is an enhancement to, current services provided by the telephone carriers. The scope of the invention is of sufficient breadth and flexibility to accommodate future technological advances by the telephone carriers, such as cellular phone location identification by LORAN, for example.

SUMMARY OF THE INVENTION

The primary object of the present invention is to provide a reliable and cost-effective manner of directly connecting callers interested in an advertiser's product with providers of the advertiser's product in the area that the call originates during the time frame in which the caller has the highest degree of interest in the advertiser's product.

A corollary object of the present invention is to accomplish the above without need for intervention by a computer or human being.

The present invention accomplishes the above objects by providing a direct-routing system having location determining means, the parameters of which can be established by a provider of specific goods or services. In the system a caller's geographic location is identified by an Automatic Number Identification (ANI) which is then correlated with a database established according to criteria of a second party, usually an advertiser or provider of goods or services.

Additional features of the present invention include billing and reporting means based on connection number, time and activity.

The data base can be self-updating and self-generating according to the desires of the advertiser or provider.

The above and other objects, features and advantages will become more readily apparent when a detailed description of the preferred embodiments are described in conjunction with the accompanying drawing figures.

BRIEF DESCRIPTION OF THE DRAWINGS

The drawing figures used to illustrate the preferred embodiments are as follows:

FIG. 8 is a table of telephone area code and exchanges occurring in four (4) ZIP codes used for illustration purposes; and FIG. 9 is a table showing a database of FIG. 8 after completion of initial processing using the system of this invention.

DESCRIPTION OF THE PREFERRED EMBODIMENTS

Before describing in detail the preferred embodiments of the invention, a glossary of terms and acronyms to be used is necessary as follows:

ADI Area of Demographic Influence.
ANI Automatic Number Identification. A caller's full telephone number.
CRI Carrier Routing Instructions. A database containing the NPA-NXX-XXXX and corresponding downlines for a particular advertiser.
CRC Carrier Routing Center. A telephone number of the provider to whom an advertiser wishes a call to be directed.
DRZ Designated Response Zone. The area from which an advertiser wishes to have telephone inquiries about the advertiser's product or service directed to the local provider of the advertiser's good or service.
GIS Geographic Information System. A computer program that provides visual interpretation of information represented by a coordinate system, typically but not necessarily latitude and longitude.
Interactive System. A non-direct telephone routing system that requires human input after a call has been made, and before the call is dispatched to the final destination.

LDC Long distance Carrier.
LEC Local Exchange Company.
MSA Metropolitan Statistical Area.
NCP Network Control Point at the LDC.
NPA The area code from which a call originates. This is also the first three digits of the ANI.
NXX The telephone exchange from which a call originates. The NXX immediately follows the NPA in the ANI.
POTS Plain Old Telephone Service. An individual telephone number.
WATS Wide Area Telephone Service. A long-distance number, characterized by the prefix "1-800" that allows for inbound and/or outbound charges to be billed to whom the number is assigned.

Figure 1:
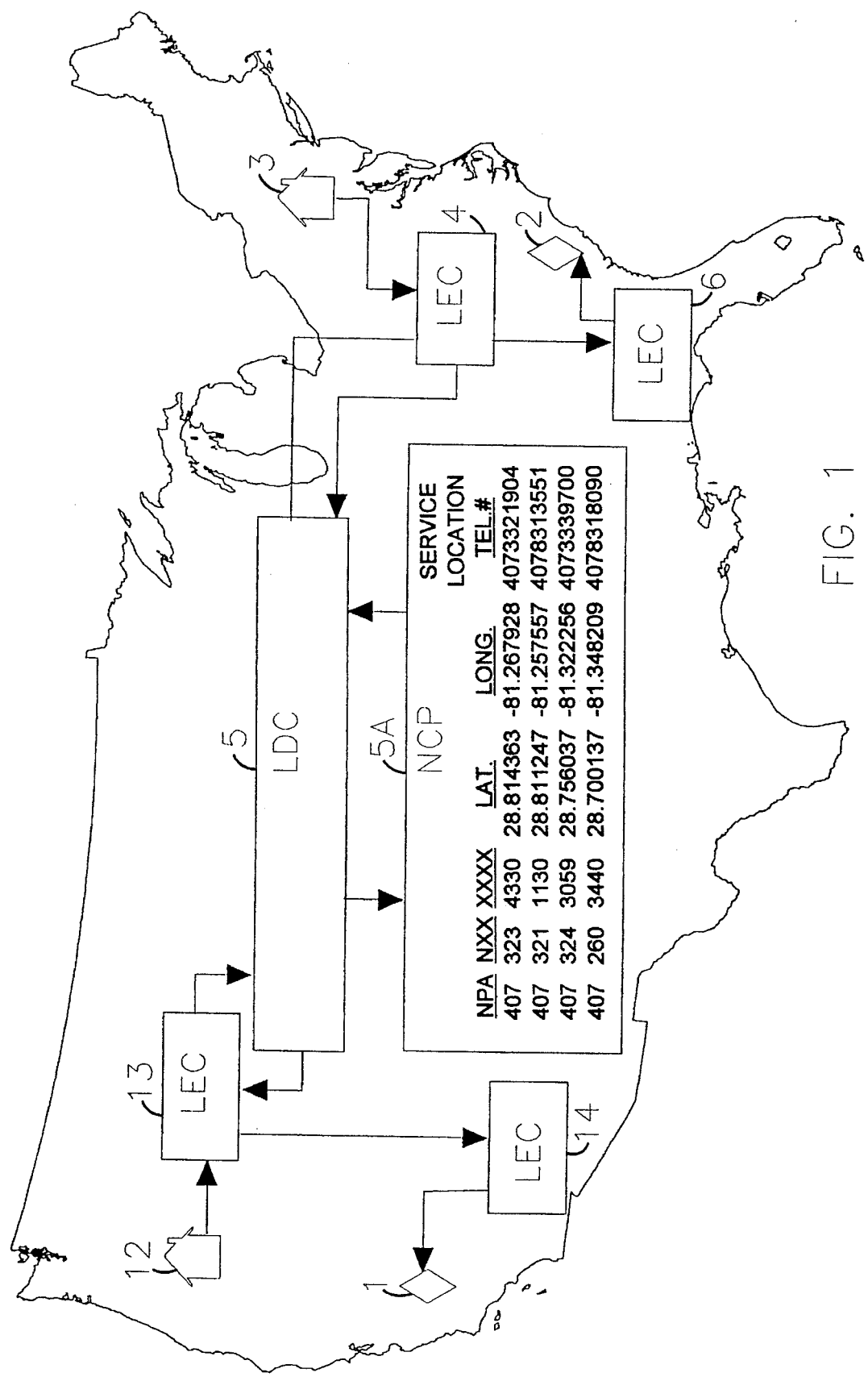
FIG. 1 is a map of the United States showing application of the present invention in a wide geographical area.

For purposes of describing the preferred embodiments in conjunction with the drawings, a hypothetical company, XYZ Diamond Brokers, is used. FIG. 1 shows the company has franchise locations in San Francisco, Calif. 1 and Hilton Head, S.C. 2. In the company's national advertising, it wishes to use the "1-800" number "1-800-DIAMOND" (1-800-342-6663) and to have nationwide calls go to the nearest local franchise location. Each location has a trade area that is proprietary to the franchisee. Franchise territories are as follows:

San Francisco—Washington State, Oregon, and California north of a line drawn at the northern boundaries of San Luis Obispo, Kern, and San Bernadino Counties.

Hilton Head—Pennsylvania, Maryland, Virginia, North Carolina, South Carolina.

A consumer in Philadelphia 3, who has the telephone number 215-652-3215, views the advertisement for XYZ Diamond Brokers and desires more information regarding the company's product. As instructed by the advertisement, the consumer calls "1-800-DIAMOND". The following sequence of events occurs:

1. The call goes to the Local Exchange Company (LEC) in Philadelphia for switching.
2. The LEC 4 recognizes the Wide Area Telephone (WATS) number, and opens a signalling channel to the Long Distance Carrier (LDC) 5 for translation of the WATS number to a Plain Old Telephone Service (POTS) number.

3. The LDC 5 accesses its own Network Control Point (NCP)SA, containing the invention's database, requesting a POTS number that corresponds to the LEC's WATS number. At the NCP are all of the direct routing instructions for the WATS number. As previously described, the NCP will provide a POTS number that will connect the caller to a territorial location, or a default phone location.

4. The LDC 5 then signals the LEC in Philadelphia 4 that the call must be switched to the LEC in Hilton Head 6, with a POTS number of 803-658-6549.

5. The LEC in Philadelphia 4 switches the call, along with the POTS information, to the LEC in Hilton Head 6.

6. The LEC in Hilton Head 6 completes the call.

There are no computer re-dials or additional calls made by the computer or an operator, as is the case in the prior patented art.

Likewise, a consumer in Oregon 12, who has the telephone number 503-854-9511, views an advertisement for XYZ Diamond Brokers and wishes to garner more information regarding the company's product. As instructed by the advertisement, the consumer calls "1-800-DIAMOND". The following sequence of events occurs:

1. The call goes to the Local Exchange Company (LEC) in Oregon for switching.

2. The LEC 13 recognizes the "1-800" WATS (Wide Area Telephone Service) number and opens a signalling channel to the LDC 5 for translation of the WATS number to a Plain Old Telephone Service (POTS) number.

3. The LDC 5 accesses its own Network Control Point (NCP), containing the invention's database, requesting a POTS number that corresponds to the LEC's WATS number. At the NCP are all of the direct routing instructions for the WATS number. As previously described, the NCP will provide a POTS number that will connect the caller to a territorial location, or a default phone location.

4. The LDC 5 then signals the LEC 13 that the call must be switched to the LEC in San Francisco 14, with a POTS number of 415-964-7825.

5. The LEC in Oregon switches the call, along with the POTS information, to the LEC in San Francisco 14.

6. The LEC in San Francisco completes the call.

Figure 2:
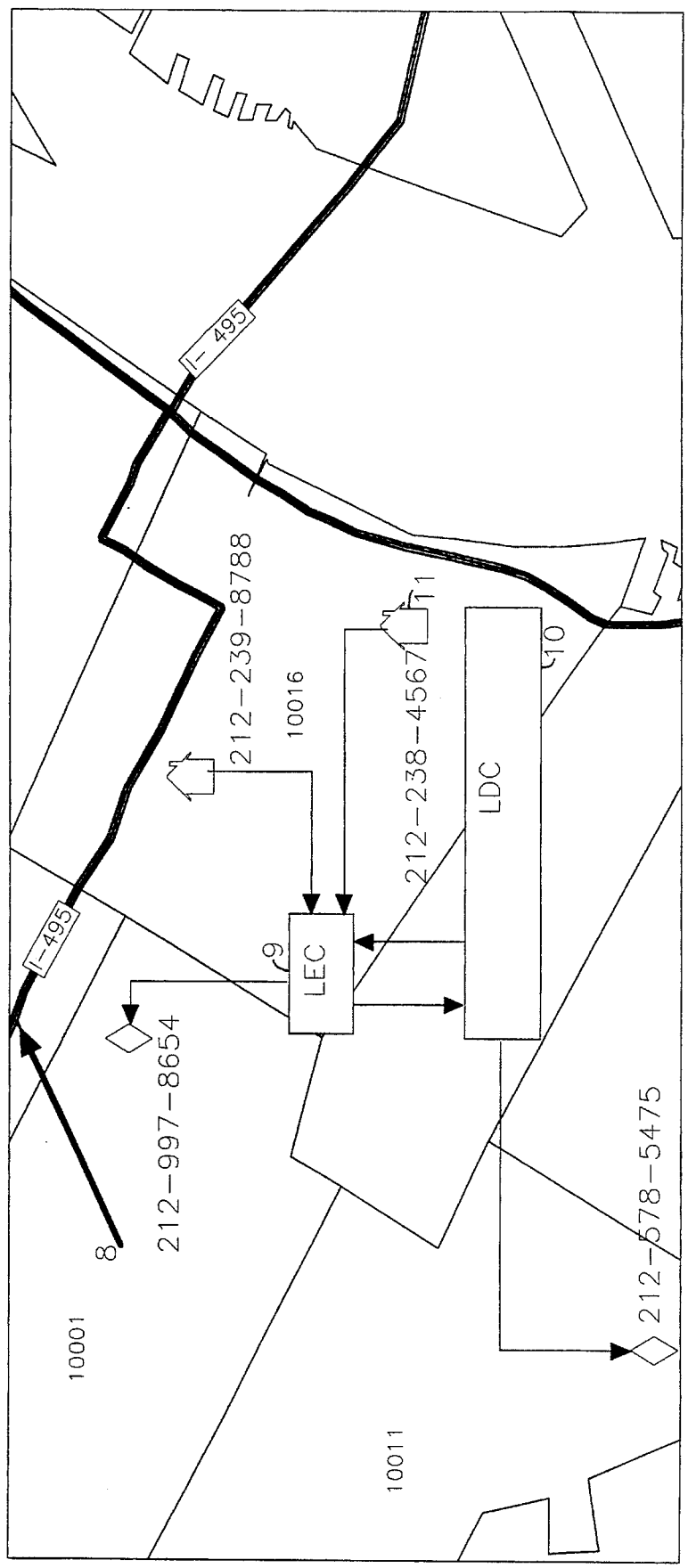
FIG. 2 is a partial map showing application of the present invention by ZIP code.

Also, unlike the prior patents, if a manufacturer has allocated its territories according to counties or to any plan other than telephone number, then the present invention will also work as illustrated in FIG. 2.

In FIG. 2 a consumer in the northern portion of ZIP code 10016, designated by 7, in an area that lies north of Interstate 495 8 in Manhattan N.Y., with a telephone number of 212-239-8788, sees the same ad as consumers in Portland and Philadelphia.

In actual use of the invention, it has been determined that while the area code exchanges ("NPA-NXX") 212-239 are located in ZIP codes 10001, 10018, 10017 and 10016, all of NPA-NXX 212-239 are located north of Interstate 495. By the definition of the franchise territory for the North Manhattan location, the calls from NPA-NXX 212-239 should go to the North Manhattan location. The alternate application would show that the ZIP Code Plus 4 for 212-239-8788 is 10016-XXXX, which is defined to be in the portion of 10016 that is north of Interstate 495.

As a matter of data validation, during database processing it was found that of the four ZIP codes in which NPA-NXX 212-239 occurs, the following distribution was present:

| | |
|---|---|
| 10001 | 5.02% |
| 10016 | 12.08% |
| 10018 | 17.08% |
| 10017 | 65.82% |

The ZIP Code Plus 4's in which NPA-NXX 212-239 occurred were all found to be north of a line formed by Interstate 495.

When the consumer dials "1-800-DIAMOND", the following events occur:

1. The call goes to the LEC 9 for switching, as previously described.

2. The LEC recognizes the WATS number, and opens a signalling channel to the LDC 10 for translation of the WATS number to a POTS number.

3. The LDC 10 signals the NCP, requesting a POTS number for the LEC's WATS number. As previously described, the NCP will provide a POTS number that corresponds to either a territorial or a default phone location.

4. The LDC 10 then signals the LEC 9 that the call must be switched to POTS number 212-997-8654.

5. The same LEC 9 in New York that signalled the LDC 10 switches the call to the final destination.

Let's assume that another consumer in New York 11, with the telephone number (ANI) 212-238-4567, sees the ad and decides to call 1-800-DIAMOND.

Database processing, as described above, has determined that this ANI should be direct routed to 212-578-5475.

When the consumer 11 dials "1-800-DIAMOND", the following events occur:

1. The call goes to the LEC 9 for switching, as previously described.

2. The LEC 9 recognizes the WATS number, and opens a signalling channel to the LDC 10 for translation of the WATS number to a POTS number.

3. The LDC 10 signals the NCP, requesting a POTS number for the LEC's WATS number. The NCP will provide a POTS number that corresponds to either a territorial or a default phone location.

4. The LDC 10 then signals the LEC 9 that the call must be switched to POTS number 212-578-5475.

5. The same LEC 9 in New York that signalled the LDC 10 switches the call to the final destination.

The present invention can also be used in conjunction with geographic boundaries other than ZIP code, state or area code, such as, bodies of water, streets/highways, railroads, congressional district, MSA, ADI, county, or city limits.

With the exception of cellular (mobile) telephones, every NPA-NXX-XXXX has an stationary address associated with it, and therefore a vertical and horizontal coordinate. Geographic locations of transportable phones will, in the near future, be identified by assignment of a vertical/horizontal coordinate, e.g., latitude and longitude, via a navigational or similar satellite communications system such as LORAN. In the event LDC's can accommodate the ANI and latitude and longitude concurrently, this invention can be employed to direct route calls from non-stationary telephones to the appropriate territorial location. Because there is an address, the Post Office has assigned it to a ZIP code. Within the ZIP code, there can be up to 10,000 ZIP Code Plus 4 codes attached to the ZIP code. These ZIP Code Plus 4's allow the Post Office (and users of the invention) to identify an address (and an NPA-NXX-XXXX) side of the street and by a block range of the street. For example, ZIP Code Plus 4 12345–6788 represents 1000 through 1100 Main Street, odd house numbers, Anytown USA. By the same token ZIP Code Plus 4 12345–6789 represents 1000 through 1100 Main Street, even house numbers, Anytown USA.

By plotting these ZIP Code Plus 4 locations against any desired geographic boundary, either manually or with a Geographic Information System (GIS), and determining which ZIP Code Plus 4's lie within that boundary, the user of the invention to identify can appropriate NPA-NXX-XXXX combinations needed. Knowing which NPA-NXX-XXXX's reside within that geographic boundary allows the user of the invention to provide the direct routing instructions to an LDC.

The invention can also be implemented using combinations of geographic boundaries. A system has already been developed employing this invention, tested and implemented whereby an advertiser with four locations wished to assign the majority of his locations full county territories, while some adjacent territories shared NPA-NXX assignment within the same county. As previously described, the NPA-NXX assignments for each location were based on the geographic predominance of that NPA-NXX within the shared county. The alternate method would have assigned the individual NPA-NXX-XXXX's that resided in the respective territories.

Figure 3:
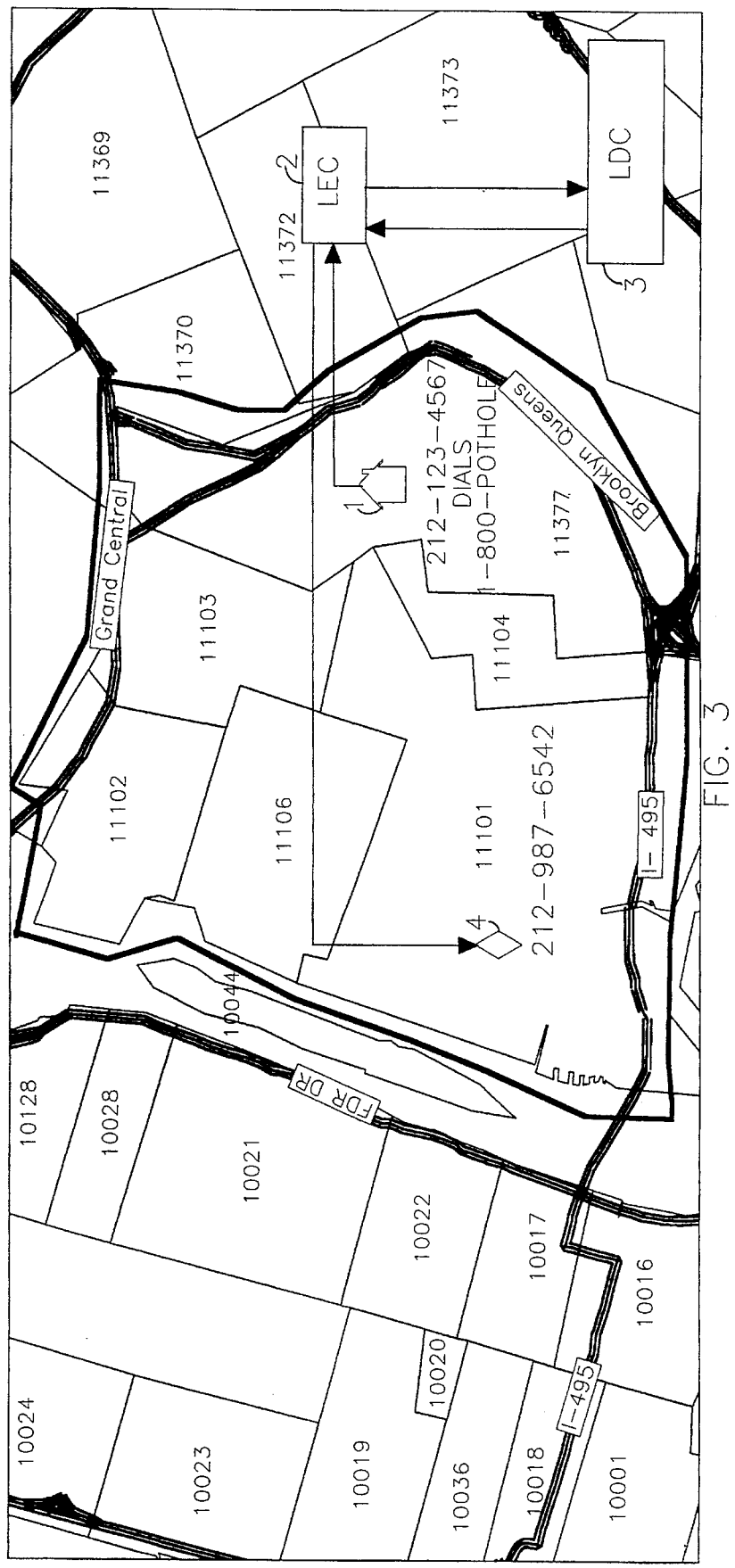
FIG. 3 is a partial map showing application of the invention by highway boundaries.

FIG. 3 illustrates the application of the invention by highway boundaries. In this illustration, a county government wishes to utilize the invention by providing to citizens the telephone number 1-800-POTHOLE to report streets that are in need of repair. Citizens will be direct-connected to the office in their area responsible for roadway maintenance. Each office has a territory that has a boundary created by major highways. In the case of FIG. 3, the office is responsible for repairs in the area defined by Grand Central Parkway on the north, Brooklyn-Queens expressway on the east, Interstate 495 on the south, and the East river on the west.

A caller at 1 with the ANI 212-123-4567 dials 1-800-POTHOLE to report street damage after a storm. The LEC at 2 reads the WATS number and signals the LDC at 3, requesting a POTS number. The LDC at 3 accesses its own NCP that contains the invention's database that corresponds to the ANI and the WATS number. The LDC signals the LEC at 2 with the appropriate POTS number, in this case 212-987-6542. The LEC then direct-connects the caller at 1 with the Department of Streets office at 4.

The present invention can also be used in conjunction with demographic boundaries. A system has already been developed by the invention, tested and implemented for NPA-NXX-XXXX assignment within boundaries assigned that did not follow geopolitical boundaries. An advertiser wished to divide the United States into 1,000 "response zones", each having a population of 90,000 residents. By employing the location counts, and determining the population per household for each given area, the invention was able to successfully carry out the task. The invention can be reliably employed for any demographic data, since that data will always correlate to a type of geographic area.

Figure 4:
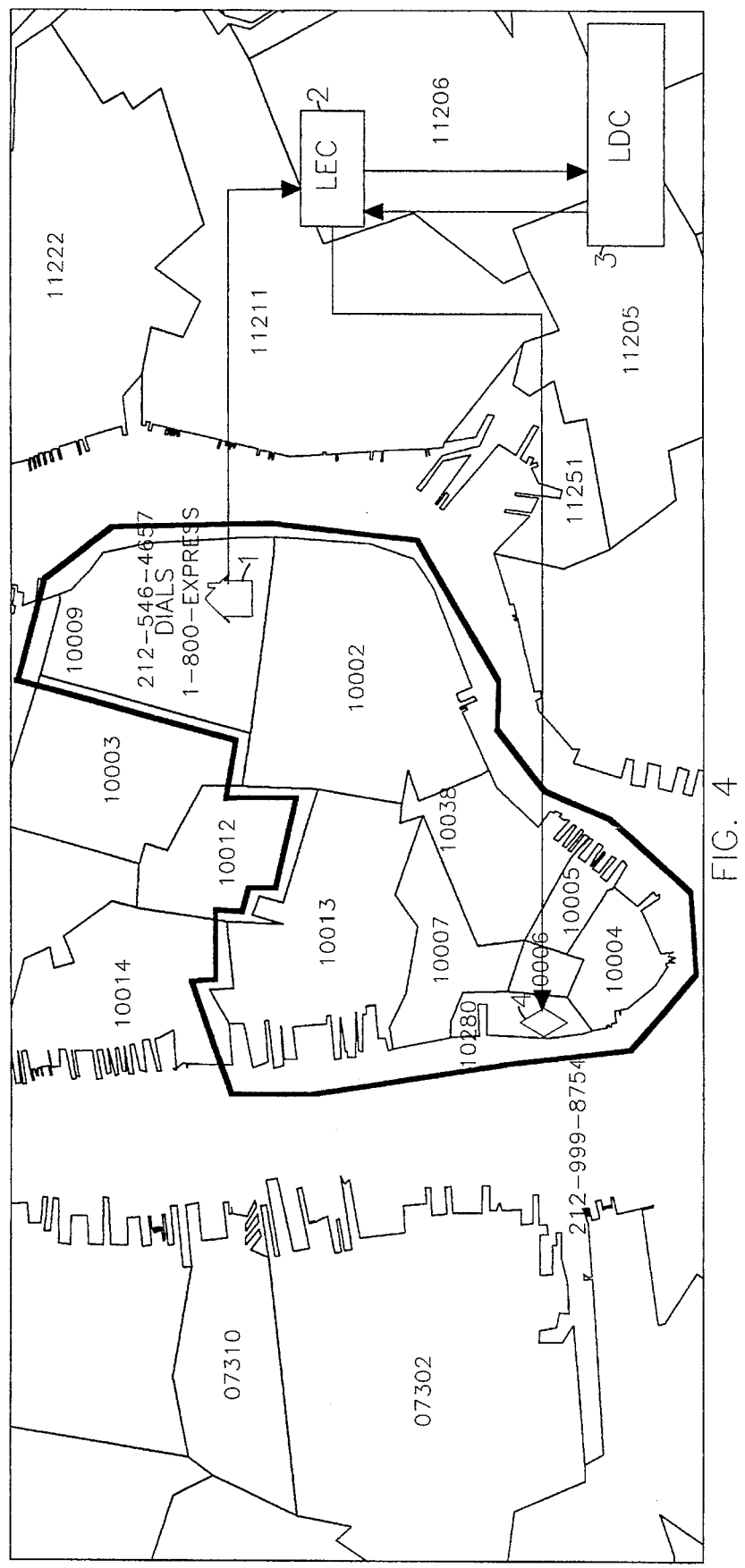
FIG. 4 is a partial map showing application previously described with respect to a population base of 90,000 individuals per designated response zone.

Referring now to FIG. 4 which illustrates the application of the invention by ZIP code boundaries, a regional post office that oversees the operation of several local post offices wishes to utilize the invention by providing to citizens the telephone number 1-800-EXPRESS. The number will be used to promote a new service the Post Office is implementing. This new service is free pickup from the sending party of any letter or parcel being sent by EXPRESS mail. The regional post office wishes to use one single telephone number for this service. Citizens will be direct-connected to the Central Post Office in their area. Each Central Post Office has a territory that encompasses several ZIP codes. In the case of FIG. FIG. 4, the Central Post Office is responsible for pickups in ZIP codes 10004, 10005, 10038, 10002, 10009, 10006, 10007, 10280, 10013.

A caller at 1 with the ANI 212-546-4657 dials 1-800-EXPRESS to request EXPRESS mall pickup of a parcel he wishes to send. The LEC at 2 reads the WATS number and signals the LDC at 3, requesting a POTS number. The LDC at 3 accesses its own NCP that contains the invention's database that corresponds to the ANI and the WATS number. The LDC signals the LEC at 2 with the appropriate POTS number, in this case 212-999-8754. The LEC then direct-connects the caller at 1 with the Central Post Office at 4.

Figure 5:
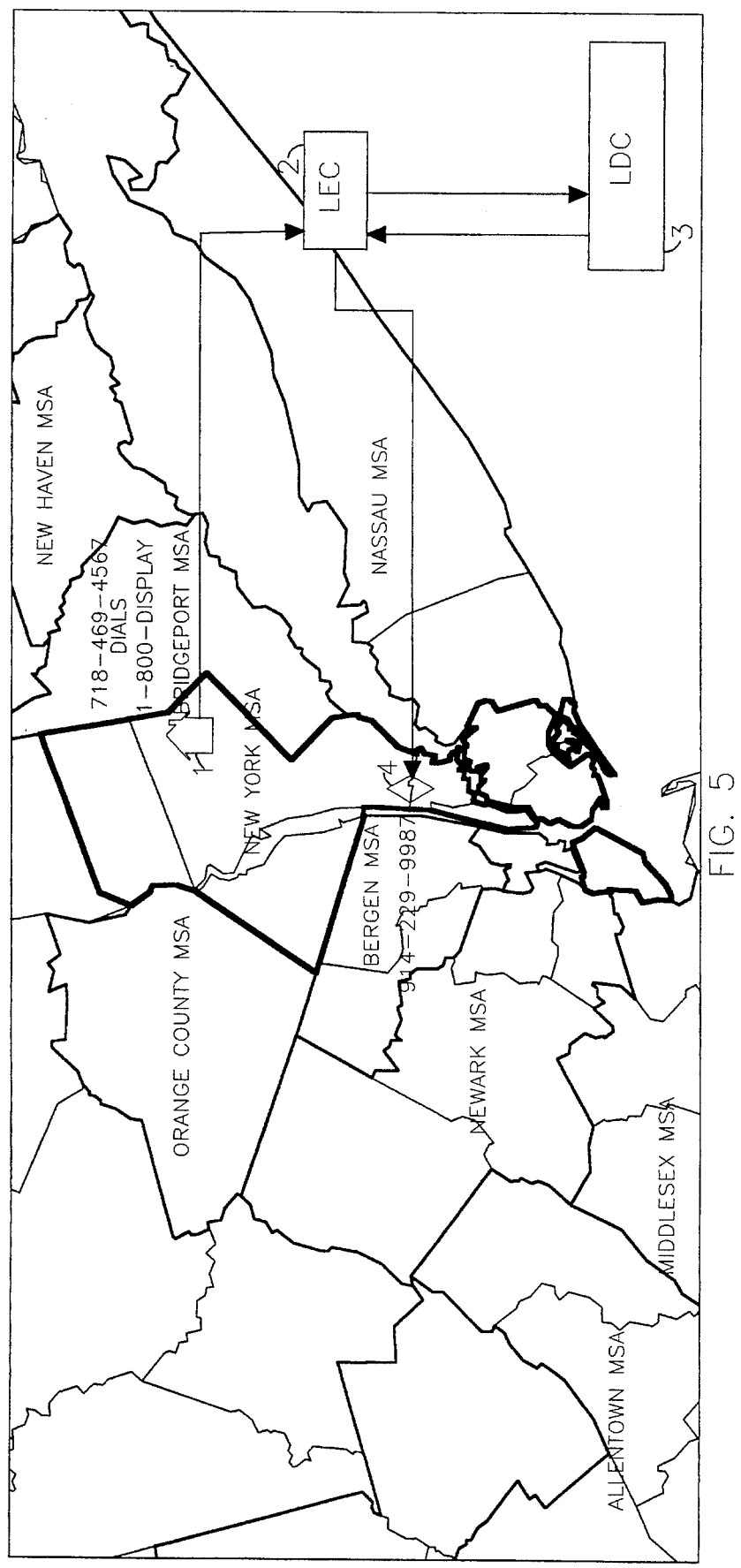
FIG. 5 is another map demonstrating application of the invention by MSA.

Referring now to FIG. 5 which illustrates the application of the invention by MSA boundaries, a national computer dealer that oversees the operation of several regional computer service centers wishes to utilize the invention by providing to customers the telephone number 1-800-DISPLAY. The number will be used to promote a new item the computer dealer is marketing. This new item is a high-performance video display that costs less than the display originally supplied with the computer to the customer. The national computer dealer wishes to use one single telephone number for this service. Customers will be directconnected to the regional computer service centers in their area. Each regional computer service centers has a territory that encompasses an entire MSA. In the case of FIG. 5, the regional computer service centers is responsible for customers in the New York MSA.

A caller at 1 with the ANI 718-469-4567 dials 1-800-DISPLAY to request information regarding the high-performance video display. The LEC at 2 reads the WATS number and signals the LDC at 3, requesting a POTS number. The LDC at 3 accesses its own NCP that contains the invention's database that corresponds to the ANI and the WATS number. The LDC signals the LEC at 2 with the appropriate POTS number, in this case 914-229-9987. The LEC then direct-connects the caller at 1 with the regional computer service center at 4.

Figure 6:
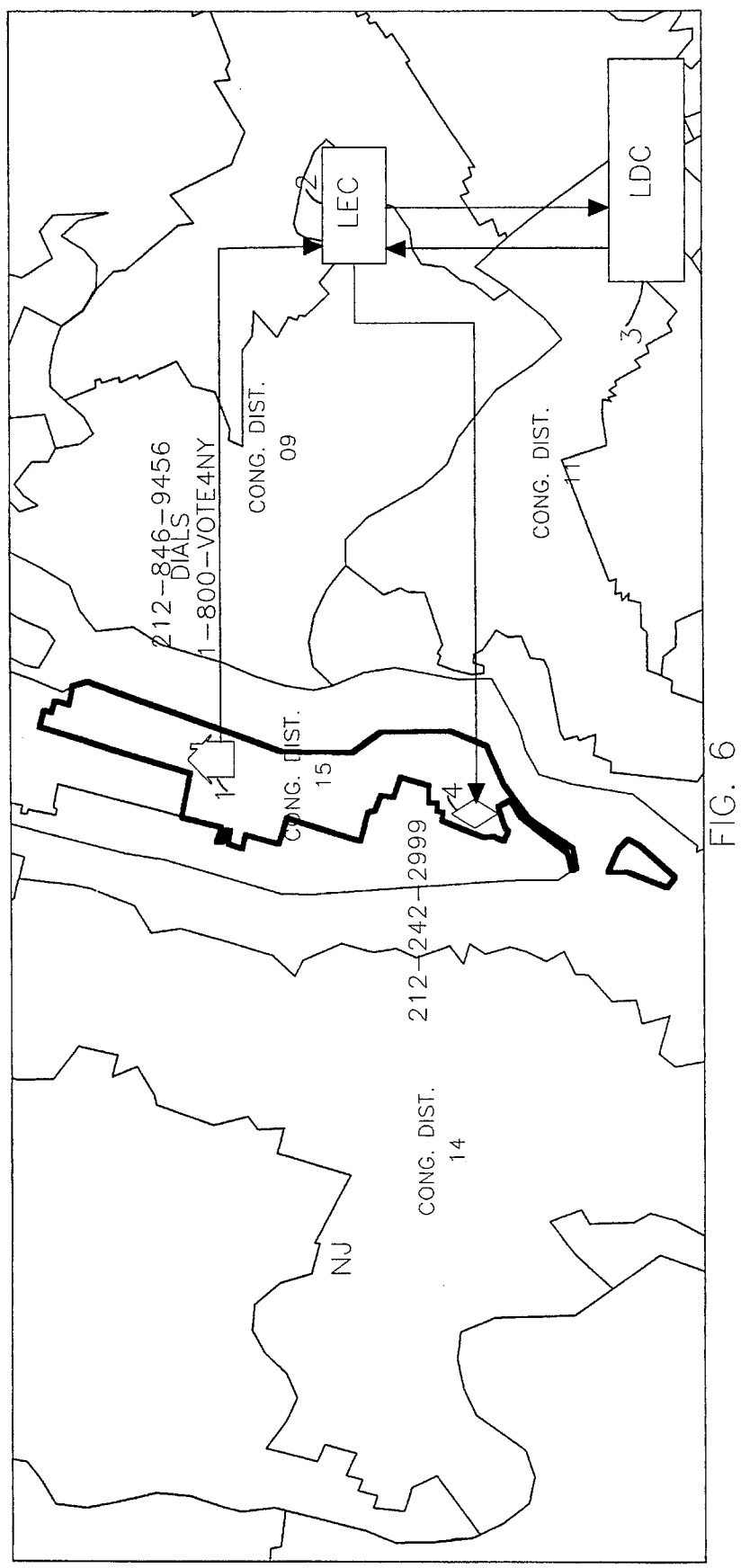
FIG. 6 is a map demonstrating application of the invention by Congressional Districts.

Referring now to FIG. 6 which illustrates the application of the invention by Congressional District boundaries, the New York Congressional Delegation wishes to utilize the invention by providing to constituents the telephone number 1-800-VOTE4NY. The number will immediately be used to solicit constituents' sentiments regarding pending legislation, and in the future will be maintained as a means of providing constituents with access to their congressional representative. Constituents dialing this number will be immediately connected to the office of the congressional representative in whose territory they reside. The New York Congressional Delegation wishes to use one single telephone number for this service. Constituents will be direct-connected to the respective office. hi the case of FIG. 6, New York Congressional District 15 will be discussed.

A caller at 1 with the ANI 212-846-9456 dials 1-800-VOTE4NY to request information regarding pending legislation. The LEC at 2 reads the WATS number and signals the LDC at 3, requesting a POTS number. The LDC at 3 accesses its own NCP that contains the invention's database that corresponds to the ANI and the WATS number. The LDC signals the LEC at 2 with the appropriate POTS number, in this case 212-242-2999. The LEC then direct-connects the caller at 1 with the Congressional District Office at 4.

Figure 7:
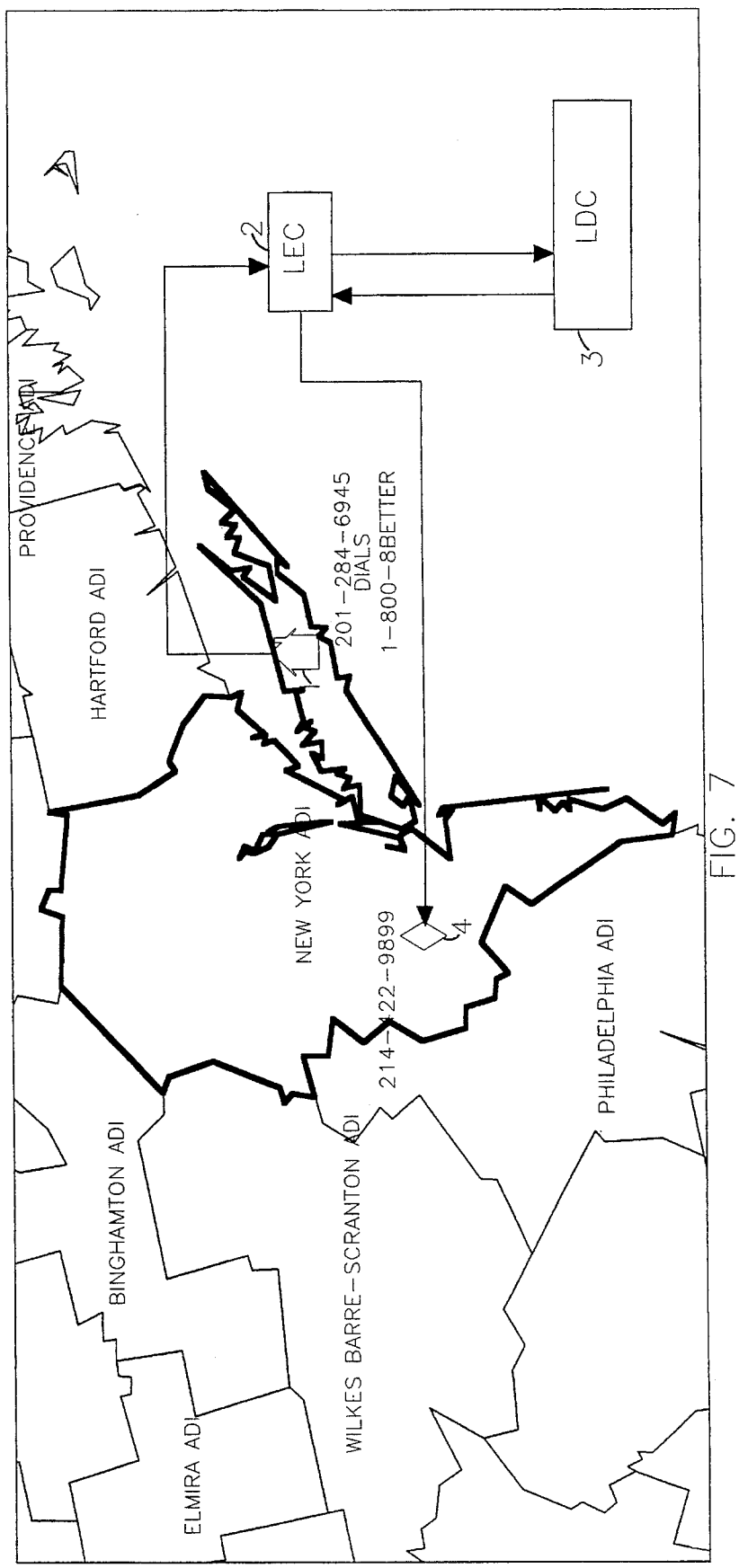
FIG. 7 is a map used to demonstrate application of the invention by ADI.

Referring now to FIG. 7 which illustrates the application of the invention by ADI boundaries, the American College of Plastic and Cosmetic Surgeons wishes to utilize the invention by providing to patients the telephone number 1-800-9BETTER. The number will be used to provide a "sounding board" to patients who did not receive satisfactory results with their plastic surgery, or those who are interested in the qualifications of a surgeon they are contemplating using. Patients dialing this number will be immediately connected to the office of the patient affairs liaison representative in whose territory they reside. The American College of Plastic and Cosmetic Surgeons wishes to use one sample telephone number for this service. Patients will be direct-connected to the respective office. In the case of FIG. 7, complaints handled by the American College of Plastic and Cosmetic Surgeons representative for the New York ADI will be discussed.

A caller at 1 with the ANI 201-284-6945 dials 1-800-9BETTER to request information regarding the surgeon who will do a face-lift. The LEC at 2 reads the WATS number and signals the LDC at 3, requesting a POTS number. The LDC at 3 accesses its own NCP that contains the invention's database that corresponds to the ANI and the WATS number. The LDC signals the LEC at (2) with the appropriate POTS number, in this case 914-422-9899. The LEC then direct-connects the caller at 1 with the Congressional District Office at 4.

The degree of accuracy at the NPA-NXX-XXXX level, with relation to vertical/horizontal coordinates of call origination, increases with every implementation of the system.

When a call is made from individual NPA-NXX-XXXX's, the carrier must, for billing purposes, capture that ANI. In capturing that ANI, it is possible to correlate the actual vertical/horizontal coordinates of that ANI, using third party or in-house data sources. Each time the invention is implemented, a new list of ANI's that responded to the advertisement is created. That listing of the full ANI and its vertical/horizontal coordinates are input into the invention's database as an update or an addendum. The process is one of perpetual update as new telephone numbers, address changes, etc., are created.

Due to the fact that a key or primary field in the database can be the ANI or the vertical/horizontal coordinates of the ANI, the correlational database may be relational or hierarchical.

Due to the fact that demographic data is relational to specific geographic areas, the database updates also provide a means to further update demographic data within a given geographic area.

If the data sources for updates are incorporated into the database used for NPA-NXX-XXXX assignment, where 407-123-4567 is known to have a vertical coordinate of "Y" and a horizontal coordinate of "X", replacing an NPA-NXX-XXXX of unknown coordinates, the system becomes self-generating.

The present invention can be used in conjunction with a Geographic Information System (GIS). As defined, a GIS provides visual interpretation of information that can be defined with a vertical and horizontal coordinate system, such as, but not limited to, latitude and longitude.

While it is by no means necessary to employ a GIS while using the invention, FIGS. 3 through 7 illustrate application of the invention with respect to various geographic and demographic criteria as provided with various GIS programs.

When the advertiser requests a certain criteria as the boundary of a designated response zone, that response zone is like a transparent layer to the base map containing the corresponding NPA-NXX-XXXX combinations. Those combinations that fall within the boundaries as determined by the advertiser are automatically assigned to the location within that response zone.

It is not implied that the boundaries outlined above are the only boundaries with which an advertiser may determine territorial definition. As previously described, there are a number of boundaries available. Indeed, the definition of DRZ boundaries is limited only by the ability to obtain or define vertical and horizontal coordinates for points along those lines or polygons drawn by the advertiser.

The present system and the method employed thereby may be best illustrated farther by examining its use in the case of a company that manufactures high-performance audio equipment.

The company manufactures high-performance audio equipment and uses a very select group of retailers to market its products. The retailer group has 1000 locations nationwide, and each has a protected and franchised territory granted from the manufacturer. In some instances, the manufacturer has only one retailer in a given state (Montana, for example), while in other instances it has several retailers in the same city (eight in New York, six in Chicago). There are also markets that the manufacturer has not yet penetrated, and the manufacturer would like to collate data from those markets in order to determine (based on caller response from current advertising) which of those markets should be granted the next franchise.

Employment of the invention in the above-mentioned scenario would be as follows:

1. DATABASE PROCESSING.

A. Obtain and/or build a database that has the following fields with each record:

NPA—area code from which a call originates.
NXX—telephone exchange from which a call originates.
ZIP code
ZIP Code Plus 4
Location Count (how many times does this NPA-NXX occur in this ZIP Code Plus 4)

B. For accuracy assurance, the information for this database, when processed, can be warranted to contain every NPA-NXX in the country, along with every ZIP Code Plus 4 that it occurs in, and how many times it occurs in each ZIP Code Plus 4.

An alternative is to acquire and/or build a database containing NPA-NXX-XXXX (telephone area code—exchange—last four digits), street address and ZIP code. Cross references are available that match street address to Zip Code Plus 4.

C. Process each NPA-NXX combination throughout the country to determine where that NPA-NXX is predominant within the area that it exists (an alternative is to identify geographic location of the full NPA-NXX-XXXX). Individual NPA-NXX's have service areas that often cross geopolitical boundaries, such as city limits, ZIP code Boundaries, county lines, etc. There are two boundaries that an NPA-NXX does not cross, and those boundaries are the limits of the NPA and the NPA-NXX will not cross state borders. This processing requires a number of sub-routines:

(1). Determine the percentage by Zip Code Plus 4 for each NPA-NXX. The question is to determine which ZIP Code Plus 4 is the one in which this NPA-NXX is most predominant.

FIG. 8 shows NPA-NXX 212–239 occurring in four ZIP codes. For simplicity, I will examine those two ZIP codes in which it is most predominant.

Within ZIP code 10017, there are 7 ZIP Code Plus 4's that it occurs in, with the highest predominance in 10017-3687 (3471 locations, 52.73% of the locations for 212–239 within ZIP code 10017)

Within ZIP code 10018, there are 6 ZIP Code Plus 4's that it occurs in, with the highest predominance in 10018-2687 (523 locations, 30.62% of the locations for 212–239 within ZIP code 10018).

If it were necessary to assign NPA-NXX's within this area by ZIP Code Plus 4 predominance, 212–239 would be assigned to the location getting ZIP Code Plus 4 10017-3687. This action is often necessary for advertisers who define territories within major metropolitan markets by street boundaries, due to the fact ZIP Code Plus 4 numbers are defined by block sections of streets.

If it were necessary to assign this NPA-NXX by ZIP code, it is obvious that this NPA-NXX would be assigned to the location within ZIP code 10017.

Any other criteria for assigning an NPA-NXX can be derived from either of these two techniques, or combinations thereof. Processing of the database continues until each and every NPA-NXX to ZIP Code Plus 4 combination has been analyzed.

(2). Validate data to ensure every ZIP code and ZIP Code Plus 4 has at least one predominant exchange assigned to it. FIG. 9 shows the database of FIG. 8 after completion of initial processing.

2. DETERMINING GEOGRAPHIC LOCATIONS.

Assign a vertical and horizontal coordinate (such as, but not necessarily, latitude and longitude) to each predominant NPA-NXX, or to each NPA-NXX-XXXX.

Determine, for each location where the advertiser wishes calls to be received, the boundary of the recipient's Desired Response Zone (DRZ).

Assign, using the same coordinate system as described hereinabove, vertical and horizontal coordinates to each point along the boundary of the DRZ.

3. ASSIGN NPA-NXX-XXXX'S TO DIRECT-ROUTE.

A. Determine which NPA-NXX's have predominance within the boundary of the DRZ, or the NPA-NXX-XXXX's that exist within that boundary.

B. Assign the recipient's downline to the NPA-NXX-XXXX's of 3A.

C. Repeat steps 3A and 3B until all recipient locations have been assigned.

4. ASSIGN DEFAULT LOCATIONS.

Assign those NPA-NXX-XXXX's not assigned in 3A through 3B to one or more default downlines, at the advertiser's discretion and direction.

The advertiser may wish for calls from all non-assigned areas to be directly routed to a corporate headquarters. The advertiser may wish, for example that calls coming from non-assigned areas in the Pacific, Mountain, Central and Eastern Time Zones go to the regional offices in San Francisco, Denver, Dallas, and Atlanta, respectively. For instance, New York City could be broken up into two (2) areas: New York Location 1—That area of Manhattan that is south of Interstate 495; and New York Location 2—That area Manhattan that is north of Interstate 495.

As previously described, the database has been processed to determine which NPA-NXX-XXXX combinations are predominant within each location's trade area. No previous systems have been able to determine where an NPA-NXX lies within a ZIP code, or by street boundaries. While an individual NPA-NXX may cross either side of Interstate 495 in New York, ZIP Code Plus 4 processing tells us that, for example, 85% of the NPA-NXX exists on north side of the Interstate, hence it assigned to New York Location 2.

It is anticipated that, as the number of telephones within a given NPA-NXX increases towards the limit of 10,000 (XXXX numbers of 0000–9999), the size of the geographic area that the NPA-NXX covers will decrease. This continued localization of NPA-NXX's will be of further assistance to the invention as time passes, and will aid in the identification of NPA-NXX-XXXX combinations that exist in a given territory.

Likewise, while an individual NPA-NXX may cross the border between San Luis Obispo and Monterey Counties, there cannot be a majority in both counties. As such, the NPA-NXX is assigned to the county in which it appears most predominant. With the alternate method, the ZIP Code Plus 4 determines the county in which the call resides.

If the boundary of a ZIP code in which an NPA-NXX is predominant is not co-linear with the boundary of the county (approximately 1% of more than 40,000 ZIP codes), the NPA-NXX is assigned by ZIP Code Plus 4, determining where in the ZIP code it is predominant (or where the NPA-NXX-XXXX is geographically located), and therefore the county in which it is predominant.

The invention is limited to the degree of sophistication of the LDC or carrier. For most LDC's currently operating, the LDC can only direct route by the NPA-NXX identification of the ANI. A system has been developed, implemented and proven that instructs the LDC to direct route a call based on full 10-digit ANI, i.e., NPA-NXX-XXXX is direct routed to Location A, NPA-NXX-XXXY is direct routed to Location B. Application for this variation would be based on known NPA-NXX-XXXX to address relationships.

After defining the trade areas, assigning the corresponding NPA-NXX (or NPA-NXX-XXXX) combinations and submitting the appropriate direct routing information to the chosen LDC, the system (network) is activated.

5. SUBMIT DIRECT ROUTING INFORMATION TO LDC OR TELEPHONE CARRIER.

A. Determine which LDC or telephone carrier to use for direct routing.

B. Ascertain in what type of format LDC or telephone carrier wishes to receive routing information.

C. Prepare NPA-NXX-XXXX and downline information in desired format of LDC or telephone carrier.

D. Submit direct routing instructions to LDC or telephone carrier.

E. LDC or telephone carrier activates downlines for advertiser. All usual and customary reporting features available from LDC or telephone carrier to advertiser.

F. Submit additional direct routing instructions to LDC or telephone carrier as requested by advertiser.

Thus, as described hereinabove, the present invention provides a novel and non-obvious method for direct routing of calls to the nearest or best location of a second party who provides goods, services or information without the need for intervention in accordance with criteria established by the second party.

While some preferred embodiments of the present invention have been described in detail hereinabove, all modifications within the scope or equivalent's of the claims are covered by this invention.

I claim:

1. A system for direct routing a telephone call from a first party who has an originating telephone number at a specific location defined by latitude and longitude coordinates who dials a telephone number including digits uniquely characteristic to a second party having a plurality of service locations, said system comprising:

- means for allocating individual latitude and longitude coordinates to each originating telephone number of all potential first parties;
- means for defining the boundaries of one or more geographical areas which can be of any size and shape according to predetermined criteria, each point along said boundaries being defined by latitude and longitude coordinates;
- means for assigning to each originating telephone number of said potential first parties a telephone number of a service location of a second party that will receive calls originating from within the boundary of a geographic area defined by said means for defining in which the individual latitude and longitude coordinates of the specific location of each of said potential first parties lie;
- means for determining the originating telephone number of the first party from which said telephone call is to be routed; and
- direct routing means for direct routing said telephone call to a service location of the second party assigned to said originating telephone number of the first party by said means for assigning.

2. The system of claim 1 wherein said means for allocating, defining and assigning are comprised by a database.

3. The system of claim 2 wherein said database resides at a long distance telephone service provider.

4. The system of claim 3 wherein said long distance telephone service provider has equipment capable of accommodating 800-type telephone traffic.

5. The system of claim 4 wherein said telephone number including digits uniquely characteristic to the second party is an 800-type telephone number.

6. The system of claim 1 wherein said predetermined criteria is defined by the second party.

7. The system of claim 1 wherein the latitude and longitude coordinates of the specific location of the first party define the street address of the first party.

8. The system of claim 1 wherein said telephone number including digits uniquely characteristic to the second party comprises one of an 800, 900 or special access code telephone number.

9. A method for direct routing a telephone call from a first party who has an originating telephone number at a specific location defined by latitude and longitude coordinates who dials a telephone number including digits uniquely characteristic to a second party having a plurality of service locations, said method comprising the steps of:

- allocating individual latitude and longitude coordinates to each originating telephone number of all potential first parties;
- defining the boundaries of one or more geographical areas which can be of any size and shape according to predetermined criteria, each point along said boundaries being defined by latitude and longitude coordinates;
- assigning to each originating telephone number of said potential first panics a telephone number of a service location of a second party that will receive calls originating from within the boundary of a geographic area defined in said step of defining in which the individual latitude and longitude coordinates of the specific location of each of said potential first parties lie;
- determining the originating telephone number of the first party from which said telephone call is to be routed; and
- directly routing said telephone call to a service location of the second party assigned to said originating telephone number of the first party by said step of assigning.

10. The method of claim 9 wherein said steps of allocating, defining and assigning are performed in a database.

11. The method of claim 10 wherein said database resides at a long distance telephone service provider.

12. The method of claim 11 wherein said long distance telephone service provider has equipment capable of accommodating 800-type telephone traffic.

13. The method of claim 12 wherein said telephone number including digits uniquely characteristic to the second party is an 800-type telephone number.

14. The method of claim 9 wherein said predetermined criteria is defined by the second party.

15. The method of claim 9 wherein the latitude and longitude coordinates of the specific location of the first party define the street address of the first party.

16. The method of claim 9 wherein said telephone number including digits uniquely characteristic to the second party comprises one of an 800, 900 or special access code telephone number.

* * * * *